United States Patent

Jarrett

[11] Patent Number: 5,252,070
[45] Date of Patent: Oct. 12, 1993

[54] HELMET LOADER FOR FLIGHT SIMULATION

[75] Inventor: Donald N. Jarrett, Fleet, England

[73] Assignee: The Secretary of State for Defence in Her Britannic Majesty's Government of the United Kingdom of Great Britain and Northern Ireland, London, England

[21] Appl. No.: 890,278

[22] Filed: May 11, 1992

[30] Foreign Application Priority Data

Jul. 10, 1990 [GB] United Kingdom ............... 9015177

[51] Int. Cl.⁵ .................................... G09B 9/10
[52] U.S. Cl. .................................... 434/59; 434/30; 364/578; 73/379.09
[58] Field of Search .................. 434/30, 64, 59; 364/578; 73/379, 379.01, 379.09; 482/10, 111-113

[56] References Cited

U.S. PATENT DOCUMENTS

| | | | |
|---|---|---|---|
| 3,309,795 | 3/1967 | Helmore | 434/59 |
| 3,330,052 | 7/1967 | Johnson et al. | |
| 4,264,310 | 4/1981 | Ashworth et al. | 434/59 |
| 4,299,576 | 11/1981 | Kron | 434/59 |
| 4,768,779 | 9/1988 | Oehman, Jr. et al. | 482/10 |
| 4,872,668 | 10/1989 | McGillis et al. | 482/113 |

FOREIGN PATENT DOCUMENTS 254496 10/1989 Japan.
8801968 3/1988 World Int. Prop. O..

Primary Examiner—Richard J. Apley
Assistant Examiner—Joe H. Cheng
Attorney, Agent, or Firm—Nixon & Vanderhye

[57] ABSTRACT

An aircraft simulator including means for determining the g-force acting on the simulated aircraft in response to the operator's controls and means for applying to a helmet (3) worn by the operator a vertical force dependent on said g-force. The means for applying a vertical force to the helmet may comprise a pneumatic piston/cylinder arrangement (14, 15, 16) responsive both to a g-demand signal determined by the position of the controls and to means (22) for monitoring the force exerted on the helmet.

The piston (15) conveniently acts across adjacent sides (8, 9) of a parallelogram linkage (6, 7, 8, 9) interconnecting a mounting (4, 5) for the helmet and a fixed support (12), enabling horizontal, vertical and rotational movements of the helmet to be made and monitored.

10 Claims, 2 Drawing Sheets

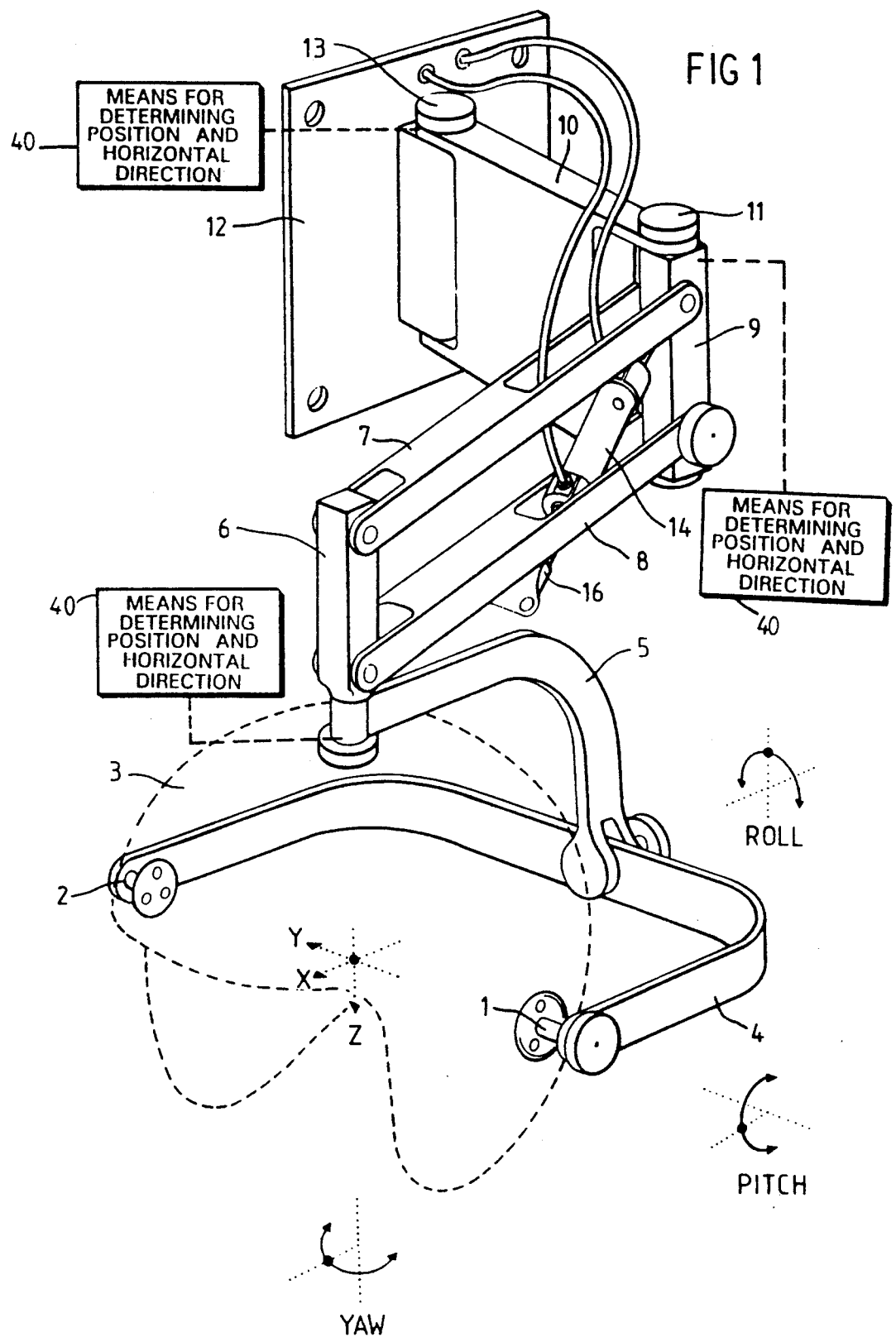

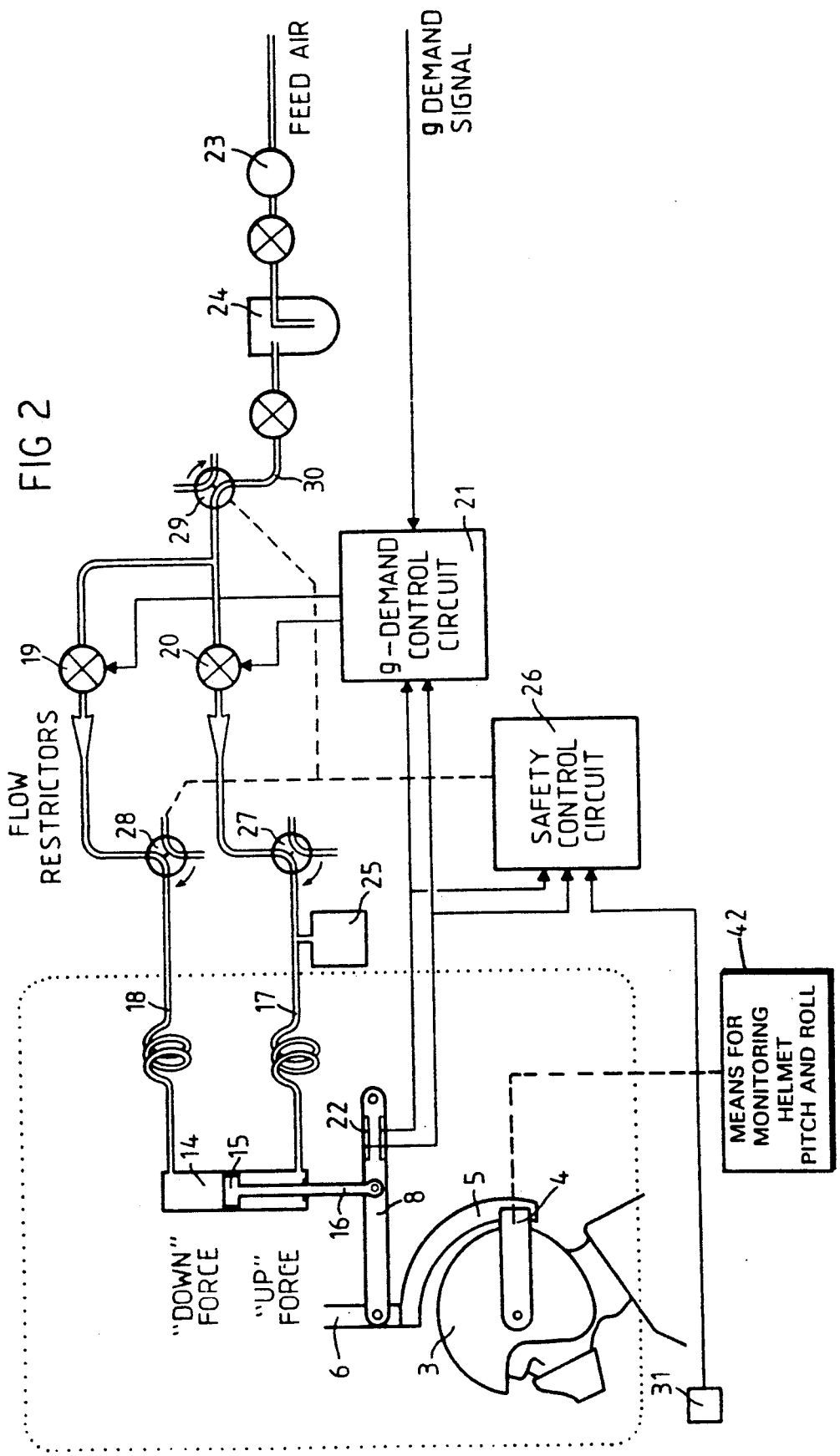

HELMET LOADER FOR FLIGHT SIMULATION

This is a continuation of International Application No. PCT/GB91/01115 filed on Jul. 8, 1991, now International Publication No. WO 92/01276.

BACKGROUND OF THE INVENTION

1. Field of the Invention

In a ground-based flight simulator it is desirable to produce the principal visual, audible, kinaesthetic and proprioceptive sensations of flight, and to model the behaviour of the vehicle so that these sensations can be changed dynamically.

2. Discussion of Prior Art

Motion contributes greatly to the sensation of flight, but it is not possible to move the simulator cockpit with exact aircraft accelerations. Instead it may be mounted on a limited displacement motion platform with washout of enduring accelerations, or placed within the gondola of a centrifuge. The choice of platform, and its degrees of freedom, depends mainly upon the required severity and duration of the accelerations in relation to the precise objective of the simulation. However, the ill effects of inappropriate accelerations and overall system costs are also very important.

In high performance aircraft the strongest movement cues come from the centripetal accelerations induced by combat manoeuvres. Here the instantaneous load factor "gz", the ratio of the aircraft lift force to weight, can exceed a value of 8 for several tens of seconds. Since such effects can only be reproduced on the ground using extensive centrifuge facilities, designers of most training and research simulators abandon the attempt, and a fixed or limited displacement mounting is used. Comparatively enduring high g-cues may be supplied instead by secondary proprioceptive sensations, such as stick shake and seat hardening, or visually by darkening the external scene.

However, a far stronger mixture of proprioceptive cues and disturbances arises from the apparent weight change of the pilot's headgear under marioeuvring loads. Although in a real aircraft the g-forces would act on the pilot in a complex manner the major effect would be felt in what to him appears to be a vertical line, the forces acting upwards or downwards depending on the motion of the aircraft. This invention seeks to generate such an apparent weight change in a ground-based simulator by applying to the helmet a controlled vertical force, proportional to the instantaneous incremental load factor of the modelled aircraft.

SUMMARY OF THE INVENTION

This invention therefore consists of an aircraft simulator including means for determining the g-force acting on the simulated aircraft in response to the operator's controls and means for applying to a helmet worn by the operator a vertical force dependent on said g-force.

The means for applying the force to the operator's helmet should ideally exert a force of a few kg to simulate a reasonable proportion of the apparent weight change of a standard helmet/oxygen mask combination and it is important that normal head movements are not inhibited and that inappropriate rotational torques or lateral and longitudinal forces are not applied.

To achieve the required force along a single axis the helmet may be linked to a piston rod attached to a piston slideable within a cylinder, the force on the piston rod being generated by the differential pressure of fluid within the cylinder on either side of the piston.

The fluid is conveniently contained in a circuit, the flow of fluid in which is controlled by control means responsive both to a g-demand signal determined by the position of the controls and an output from means for monitoring the force exerted on the helmet.

The cylinder may be part of a hydraulic system, but for safety in the event of transient errors a pneumatic system with air as the fluid is preferred. In this case, the control means may take the form of regulators for controlling the flow of air from an external compressed air supply.

Particularly with a pneumatic system, the pressure of fluid on each side of the piston within the cylinder may be controlled by separate control means each responsive both to a g-demand signal determined by the position of the controls and an output from means for monitoring the force exerted on the helmet.

Since the control means are responsive to means for detecting the force exerted on the helmet, vertical movements of the helmet can be accommodated since instantaneous changes in the force on the helmet caused by vertical helmet movement here immediately detected and countered by operation of the control means.

By the use of such an arrangement, it is straightforward to incorporate safety features, for example means for limiting the degree or rate of change of force acting on the helmet and a manually-operable switch to remove immediately the force acting on the helmet by virtue of the pressure applied to the piston.

In order to retain considerable freedom of movement for the operator, yet be able to exert the required force on the helmet at all times, the means for applying a vertical force to the helmet may comprise means for applying a torque to a parallelogram linkage interconnecting the helmet with a fixed support, one side of said linkage being linked to said fixed support and maintained at a constant height whilst being free to move in a horizontal direction and the opposite side of the linkage being linked to the helmet. By this arrangement, application of a torque to the linkage results in a vertical force being applied to the helmet whilst accommodating a degree of vertical movement of the helmet.

The means for applying a torque to the parallelogram linkage may comprise a geared electrical motor, for example, but said means preferably comprises a fluid operated piston/cylinder arrangement as described earlier, connected across adjacent sides of the linkage.

When this arrangement is used, the side of the linkage maintained at a constant height may be fixed to the simulator equipment, either directly or through vertical hinges in order to permit horizontal movements, and the opposite side of the linkage incorporates means for attachment to the helmet. Such means may permit roll and pitch movements of the helmet.

BRIEF DESCRIPTION OF PREFERRED EMBODIMENTS

By way of example, one embodiment of the invention will now be described with reference to the drawings, of which FIG. 1 is a schematic perspective view of a linkage arrangement for a helmet loader control system for a flight simulator constructed in accordance with the invention, and FIG. 2 is a schematic circuit diagram of a electro-pneumatic control system used in the arrangement shown in FIG. 1.

DETAILED DISCUSSION OF PREFERRED EMBODIMENTS

With reference to FIG. 1, means for attaching a linkage arrangement to a helmet includes two spigots 1 and 2 mountable in-line one on either side of a helmet 3 (indicated by dashed lines in FIG. 1). A U-shaped bracket 4, of sufficient depth to clear the back of the helmet, is rotatably mounted on the spigots 1 and 2 and also at its mid-point to a right-angle bracket 5. The bracket 5 is mounted on a pivot 6 which 4s maintained in a vertical direction (see below) as a result of which the bracket 4 is constrained to rotate in the bracket 5 about a horizontal axis and the mid-point of the line between the spigots 1 and 2 (roughly the centre point of the helmet) is maintained at the same height relative to the pivot 6.

As, an optional feature, the bearings between the bracket 4 and one of the spigots and the bracket 5 incorporate means for monitoring the helmet orientation during simulation exercises such as means for determining position and horizontal direction of the helmet represented by boxes 40 in FIG. 1 or a means for monitoring helmet pitch and roll represented by boxes 42 in FIG. 2.

The pivot 6 forms one member of a parallelogram linkage 6. 7, 8 and 9 upper and lower sides 7 and 8 of which are of equal length and the fourth side 9 of which is attached to a rectangular plate 10 by means of a pivot 11. The plate 10 is attached in turn to a mounting plate 12 by means of a pivot 13 which is -parallel to the pivot 11. The mounting plate is intended to be fixed in a vertical plane (for example to the side of a piece of simulator equipment in such a position as to accommodate the likely movements of the operator when wearing the loaded helmet) and with the pivot 13 in a vertical direction so that the pivot 11 and the pivot 6 (see above) are maintained also in a vertical direction.

The vertical forceacting on the helmet through the linkage is produced by means of a pneumatic cylinder 14 hinged to the side 9 and accommodating a piston 15 attached to a piston rod 16 hinged to the lower side 8. The differential force acting on the piston 15 (see FIG. 2) by air in lines 17 and 18 causes a torque between the sides 8 and 9 of the parallelogram linkage which is translated into a vertical force acting through the pivot 6.

The vertical force acting on the helmet 3 is generated, as stated above, by the relative air pressure in the lines 17 and 18 feeding the cylinder 14. This relative air pressure is produced by a compressed air supply (not shown) acting through two regulators 19 and 20 one in each of the lines 17 and 18 each regulator being responsive to a respective output from a control circuit 21.

The output of the control circuit 21 is governed by a g-demand signal from the simulator computer which reflects the g-force which would be acting on the aircraft being simulated according to the current position of the controls and other variables fed into the computer, and also the output from a transducer 22, mounted on the side 8 of the linkage, which monitors the bending moment on the side 8. Thus, if at any time the output from the transducer 22 does not equate to the g-demand signal, then one or other of the regulators will be operated to regain this equality.

In an alternative embodiment, the relative pressure across the piston is produced by a single regulator 19 in a pneumatic circuit including the lines 17 and 18, the regulator being controlled electrically, as before, by the g-demand control circuit 21.

Such a use of a single regulator could be complemented by a manual regulator, located in the line 17 in a similar position to the regulator 20, in order to set a constant, relatively low air pressure in the line 17 and hence to provide a desired constant proportion of the head-borne helmet weight.

The pneumatic circuit includes conventional features such as an isolation valve 23, an input pressure regulator and filter unit 24 and a reservoir 25 for accommodating small changes in pressure which occur with piston displacement under vertical movement. A safety control unit 26 is also provided, the effect of which when actuated is to rotate ganged valves 27, 28 and 29 in respectively lines 17, 18 and the input line 30 to exhaust the lines 17 and 18 to atmosphere and block line 30, and in doing so to remove the air pressure on both sides of the piston 15. The safety control unit can operate automatically, for example when pressure limits are exceeded, or manually by the operator or other personnel by the pressing of a disabling switch 31.

The system as hereinbefore described includes safety features which can be arranged to operate in a fail-safe manner and without having the disadvantages of systems for applying loads to simulator helmets which employ weights or springs. The bearings which permit essentially universal movement of the helmet can be designed to be virtually friction-free and the linkage brackets can be made of light-weight materials so that inertial effects are minimised. The arrangement of brackets as shown in FIG. 1 provides no visual obstruction to the operator and cabling, for example to helmet-mounted display equipment or to head direction sensors, can likewise be kept away from the operator's field of view.

The invention as described may be readily adaptable to provide means for alleviating head-borne weight without impeding the head movement of a seated person. An application for this is as a prosthesis for patients recovering from neck injuries.

Those skilled in the art will readily appreciate variations of the embodiments described which fall within the scope of the invention.

I claim:

1. An aircraft simulator including:
   means for determining the g-force acting on the simulated aircraft in response to the operator's controls; and
   means for applying to a helmet worn by the operator a vertical force dependent on said g-force, where said means for applying a vertical force to the helmet comprises:
   a parallelogram linkage interconnecting the helmet with a fixed support, one side of said linkage being linked to said fixed support and maintained at a constant height whilst being free to move in a horizontal direction and the opposite side of the linkage being linked to the helmet; and
   means for applying a torque to said parallelogram linkage.

2. An aircraft simulator according to claim 1 in which the means for applying a torque to said linkage comprises:

a piston rod attached to a piston slideable within a cylinder, the force on the piston rod being generated by the differential pressure of fluid within the cylinder on either side of the piston.

3. An aircraft simulator according to claim 2 in which the fluid is contained in a circuit, the flow of fluid in which is controlled by control means responsive both to a g demand signal determined by the position of the controls and an output from means for monitoring the force exerted on the helmet.

4. An aircraft simulator according to claim 3 in which the cylinder (14) is part of a pneumatic system, the fluid is air, and the control means (19) comprise regulators for controlling the flow of air from an external compressed air supply.

5. An aircraft simulator according to claim 2 in which the pressure of fluid on each side of the piston within the cylinder is controlled by separate control means each responsive both to a g-demand signal determined by the position of the controls and an output from means for monitoring the force exerted on the helmet.

6. An aircraft simulator according to claim 1 including a transducer mounted on one arm of the parallelogram linkage for monitoring the force exerted on the helmet.

7. An aircraft simulator according to claim 1 in which one side of said linkage is linked to the fixed support through a plurality of vertical hinges providing freedom of movement of the linkage in a horizontal direction.

8. An aircraft simulator according to claim 7 in which at least one of said vertical hinges includes means for determining the position and horizontal direction of the helmet.

9. An aircraft simulator according to claim 1 in which said opposite side of the linkage is linked to the helmet through means for permitting pitch and roll movements of the helmet.

10. An aircraft simulator according to claim 9 in the means which permitting pitch and roll movements of the helmet includes means for monitoring the helmet pitch and roll orientation during simulation exercises.

* * * * *